(12) United States Patent
Aukzemas et al.

(10) Patent No.: US 6,238,155 B1
(45) Date of Patent: May 29, 2001

(54) TORQUE SCREW FASTENER

(75) Inventors: Thomas V. Aukzemas; Thomas J. Ellis, both of Wilmington, DE (US); Harry L. Dickerson, Downingtown; Lianli Ji, West Chester, both of PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 09/099,594

(22) Filed: Jun. 18, 1998

Related U.S. Application Data

(63) Continuation-in-part of application No. 08/811,872, filed on Mar. 5, 1997, which is a continuation of application No. 08/554,563, filed on Nov. 6, 1995, now Pat. No. 5,642,972.

(51) Int. Cl.$^7$ .................................................. F16B 21/18
(52) U.S. Cl. ........................ 411/107; 411/353; 411/352; 411/970
(58) Field of Search ..................................... 411/352, 353, 411/970, 999, 107, 402, 408, 410, 919, 7; 151/9, 10, 11, 13, 39

(56) References Cited

U.S. PATENT DOCUMENTS

| | | | |
|---|---|---|---|
| D. 283,591 | 4/1986 | Swanstrom | D8/387 |
| D. 357,176 | 4/1995 | Ernest et al. | D8/387 |
| D. 388,316 | 12/1997 | McDonough et al. | D8/387 |
| 748,078 | 12/1903 | Kaisling . | |
| 1,166,345 | 12/1915 | Gates . | |
| 1,188,420 | 6/1916 | Eadie . | |
| 1,664,820 | 4/1928 | Hughes . | |
| 2,006,359 | 7/1935 | Lackner | 151/39 |
| 2,151,255 | 3/1939 | Witchger | 85/32 |
| 2,331,322 | 10/1943 | Heinick | 85/32 |
| 2,470,927 | 5/1949 | Hale, Jr. | 151/31 |
| 2,503,189 | 4/1950 | Biba, Jr. | 64/29 |
| 2,553,236 | 5/1951 | Bratfisch | 85/40 |

(List continued on next page.)

FOREIGN PATENT DOCUMENTS

| | | |
|---|---|---|
| 558456 | 6/1958 | (CA) . |
| 1339942 | 11/1962 | (FR) . |
| 2 268 977 | 4/1975 | (FR) . |
| 2 578 009 | 2/1986 | (FR) . |
| 2 636 384 | 9/1988 | (FR) . |
| 625345 | 6/1949 | (GB) ................................ 411/396 |
| 626013 | 9/1949 | (GB) . |
| 825877 | 12/1959 | (GB) . |
| 1579730 | 11/1980 | (GB) . |

OTHER PUBLICATIONS

Southco, Inc., Southco Latches and Access Hardware Handbook 45 NA, C1–C44, Pennsylvania, 1995.

Penn Engineering & Manufacturing Corp., "Fasteners For Use In Or With PC Boards", Pem Bulletin K–488, (Danboro, PA) 1980.

Penn Engineering & Manufacturing Corp., "Snap–Top Stadoffs", Pem Bulletin SSA–988, (Danboro, PA) 1987.

Penn Engineering & Manufacturing Corp., "Type PF11 Self–Clinching Panel Fastemer Assembly", Pem bulletin PF11–297, (Danboro, PA) 1997.

Camloc Fasteners, "Captive Screws", Catalog No. 3800, pp. 1–12 (Hasbrouck Heights, NJ).

Huck International, Inc., "Captive Fasteners and Rivetless Nut Plates", (California, 90712) 1996.

*Primary Examiner*—Michael F. Trettel
*Assistant Examiner*—Fredrick Conley
(74) *Attorney, Agent, or Firm*—Paul & Paul

(57) ABSTRACT

A torque screw having a screw with a head and a threaded shaft, a knob having a central longitudinal axis coaxial with the screw and a one-directional ratchet disposed between the knob and the screw that engages to allow the screw to be disengaged in a counter-clockwise direction using the knob, and engages when rotated in a clockwise direction to a predetermined torque value. Once that predetermined torque value is reached, the ratchet is caused to slip such that the knob turns relatively freely with respect to the screw.

8 Claims, 2 Drawing Sheets

U.S. PATENT DOCUMENTS

| | | | |
|---|---|---|---|
| 2,773,574 | 12/1956 | Able | 192/43.1 |
| 2,831,520 | 4/1958 | Clarke | 151/39 |
| 2,967,557 | 1/1961 | Tait et al. | 151/69 |
| 2,987,811 | 6/1961 | Acres | 29/437 |
| 3,033,260 | 5/1962 | Snow | 151/41.7 |
| 3,052,942 | 9/1962 | Mulvaney | 24/224 |
| 3,059,736 | 10/1962 | Boyd | 189/36 |
| 3,126,935 | 3/1964 | Tuozzo | 151/69 |
| 3,137,336 | 6/1964 | Wing | 151/41.73 |
| 3,180,389 | 4/1965 | Frank | 151/69 |
| 3,195,600 | 7/1965 | Middleton, Jr. | 151/69 |
| 3,204,680 | 9/1965 | Barry | 151/69 |
| 3,209,807 | 10/1965 | Ryner | 151/69 |
| 3,244,212 | 4/1966 | Barry | 151/69 |
| 3,245,450 | 4/1966 | Sauter | 151/69 |
| 3,250,559 | 5/1966 | Sommerfeld | 292/251 |
| 3,263,728 | 8/1966 | Lynch | 151/69 |
| 3,279,302 | 10/1966 | Modrey | 85/70 |
| 3,343,581 | 9/1967 | Martin et al. | 151/69 |
| 3,346,032 | 10/1967 | Gulistan | 151/69 |
| 3,385,341 | 5/1968 | Garstkiewicz | 151/39 |
| 3,437,119 | 4/1969 | Dey | 151/69 |
| 3,465,803 | 9/1969 | Ernest et al. | 151/69 |
| 3,564,563 | 2/1971 | Trotter et al. | 24/221 |
| 3,571,904 | 3/1971 | Gulistan | 29/443 |
| 3,718,950 | 3/1973 | Engstrom | 24/217 |
| 3,865,007 | 2/1975 | Stanback | 85/61 |
| 3,866,878 * | 2/1975 | Yamamoto | 151/13 X |
| 3,912,411 | 10/1975 | Moffat | 403/259 |
| 3,958,308 | 5/1976 | Gooding | 24/221 |
| 4,007,516 | 2/1977 | Coules | 24/221 |
| 4,047,266 | 9/1977 | Bisbing | 24/221 |
| 4,107,960 | 8/1978 | Neiman | 248/165 |
| 4,109,691 | 8/1978 | Wilson | 145/50 D |
| 4,199,216 | 4/1980 | Gryetko | 339/272 |
| 4,387,497 | 6/1983 | Gulistan | 29/511 |
| 4,398,322 | 8/1983 | Ewen | 24/201 |
| 4,418,590 | 12/1983 | Dubiel et al. | 81/467 |
| 4,472,098 | 9/1984 | Kiefer | 411/369 |
| 4,492,500 | 1/1985 | Ewing | 411/5 |
| 4,602,903 | 7/1986 | Wilburn | 411/222 |
| 4,692,075 | 9/1987 | Metz | 411/7 |
| 4,915,557 | 4/1990 | Stafford | 411/107 |
| 4,952,107 | 8/1990 | Dupree | 411/103 |
| 4,964,773 | 10/1990 | Schmidt | 411/373 |
| 5,042,880 | 8/1991 | Garuti et al. | 301/9 DN |
| 5,094,579 | 3/1992 | Johnson | 411/107 |
| 5,120,168 | 6/1992 | Padula | 411/5 |
| 5,209,018 | 5/1993 | Heinrich | 49/449 |
| 5,336,028 | 8/1994 | Yamomoto | 411/107 |
| 5,374,268 | 12/1994 | Morris | 607/119 |
| 5,382,124 | 1/1995 | Frattarola | 411/352 |
| 5,388,139 | 2/1995 | Swanstrom | 411/107 |
| 5,429,467 | 7/1995 | Gugle et al. | 411/182 |
| 5,537,262 | 7/1996 | Aoki et al. | |
| 5,544,992 | 8/1996 | Ciobanu et al. | 411/353 |
| 5,611,654 | 3/1997 | Frattarola et al. | 411/432 |
| 5,642,972 | 7/1997 | Ellis et al. | 411/353 |

* cited by examiner

TORQUE SCREW FASTENER

This application is a continuation-in-part application of U.S. application Ser. No. 08/811,872, filed on Mar. 5, 1997, now pending, which is a continuation of U.S. application Ser. No. 08/554,563, filed on Nov. 16, 1995, now U.S. Pat. No. 5,642,972.

BACKGROUND OF THE INVENTION

This invention relates to torque screws of the type generally used to attach an object to a panel or frame wherein it is desired to limit the torque the screw may place on either the object or frame such that potential damage caused by over tightening the screw is eliminated.

Various requirements in manufacturing and assembly of components have dictated the need for a screw fastener that cannot be over tightened such that damage to panels or other object to which the fastener is attached does not occur. Various torque limiting screws exist in the prior art, including U.S. Pat. No. 5,120,168 to Padula, and U.S. Pat. No. 4,109,691 to Wilson, each of which is a "single use only" screw which provides tamper resistance, but here, once the screw is installed, it cannot easily be unscrewed. U.S. Pat. No. 4,472,098 to Kiefer is an invention for a torque limiting nut that uses an elastomeric material to engage a threaded screw shaft. None of these patents disclose a torque screw that allows reuse an indefinite number of times and allows the screw to be unscrewed in a normal manner.

Additionally, none of these torque screws is of a captive screw style.

Finally, it would be advantageous to have an audible signal indicating that the torque screw has reached its predetermined torque limit. It is not believed that any screws of the present type have this audible feature.

SUMMARY OF THE INVENTION

The present invention relates to a torque screws in general. The present invention provides a torquelimiting arrangement in which the screw may be tightened down to a particular torque. Once that torque value is reached, the knob of the screw rotates without significant further tightening down of the threads of the screw. The action is accomplished by means of a "C" shaped spring which acts as a driver to transmit torque from the knob to a flange on the screw in the tightening mode, but that deflects inwardly, thus disengaging the driving action when the knob is rotated clockwise at a point when a predetermined torque is reached.

The torque screw is hand tightenable to tighten, for example, a first panel to a second panel, but once the predetermined torque is reached, the torque screw "slips" and allows for substantially no more significant torque to be supplied to the screw threads.

The torque screw comprises a screw having a head and a threaded shaft, a knob having a central longitudinal axis coaxial with the screw, and a one-directional ratchet means disposed between the knob and the screw that engages to allow the screw to be disengaged in a counter-clockwise direction using the knob, and engages when the knob is rotated in a clockwise direction to a predetermined torque value. Then, the knob slips generally freely, such that further clockwise rotation causes the knob to slip relative to the knob. When the knob is rotated in a counterclockwise direction, the ratchet locks and causes the screw to rotate counterclockwise at all times during the counterclockwise rotation of the knob.

An alternate embodiment has the above mechanism, but has a ferrule that is attachable to a panel, where the knob is captivated on the panel. The captivation means of the knob on the ferrule allows for limited axial movement of the knob with respect to the ferrule and full rotational movement of the knob with respect to the ferrule, but limited by the ratchet means.

A driver recess is optionally placed on the top surface of the knob to aid in rotating the screw.

It is therefore an object of the present invention to provide a new and improved torque screw.

It is another object of the present invention to provide a new and improved torque screw that is reliable and simple to manufacture.

It is another object of the present invention to provide a new and improved torque screw that spins generally freely relative to the screw shaft once a predetermined torque is reached.

It is another object of the present invention to provide a new and improved torque screw that is in the form of a single article without the need for a separate torque wrench or driver.

It is a still further object of the present invention to provide a new and improved torque screw that provides a desired torque by hand or with a standard screwdriver or similar tool.

It is a further object of the present invention to provide a new and improved torque screw that provides audible indication of when the maximum torque allowed by the screw has been reached.

It is a still further object of the present invention to provide a new and improved torque screw that provides for the torque screw to be captivated on a panel such that loose items of hardware are eliminated.

Other objects and advantages of the present invention will become apparent from the following description taken in conjunction with the accompanying drawings.

DESCRIPTION OF THE PREFERRED EMBODIMENT

Figure 1:
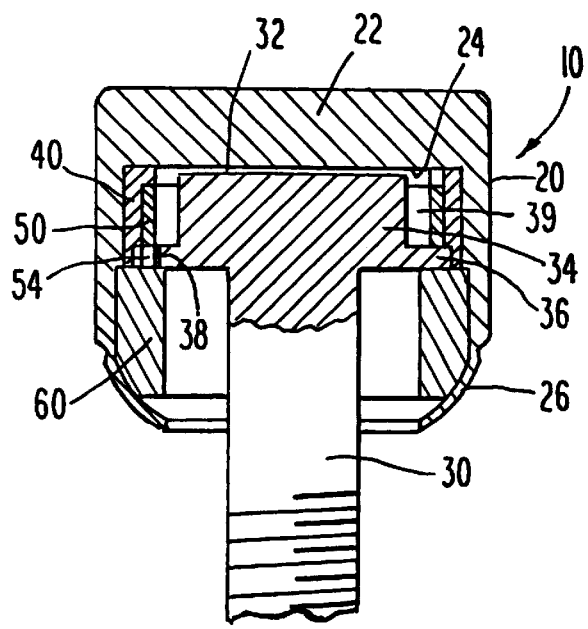
FIG. 1 is a cutaway elevational view of a torque screw in accordance with one embodiment of the present invention.
Figure 2:
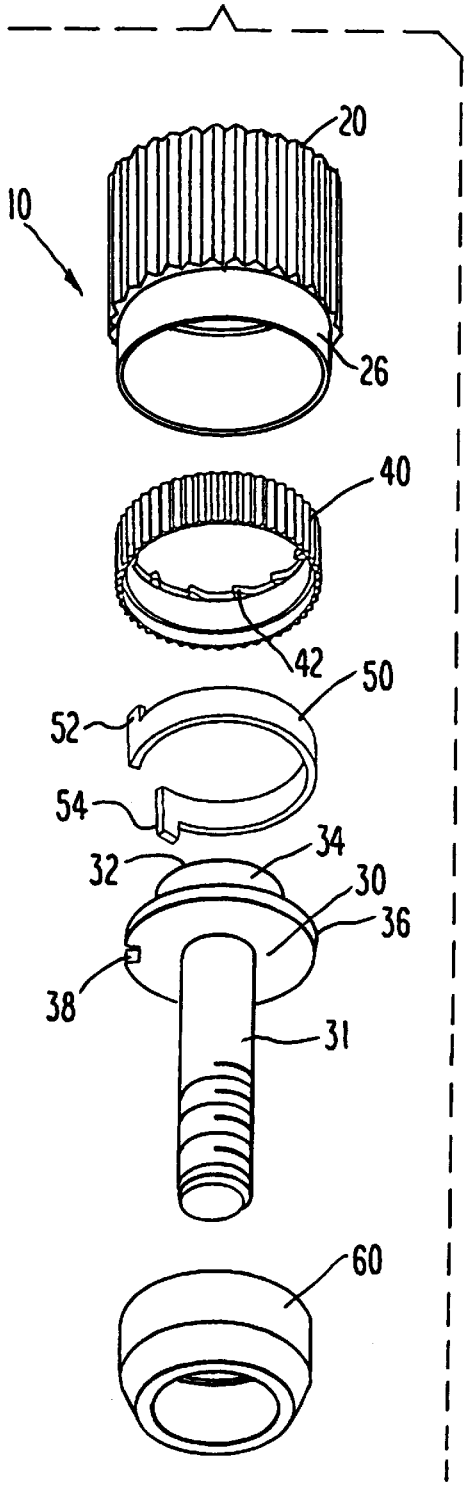
FIG. 2 is an exploded perspective view of a knob, screw, C-spring, ratchet wheel, and retainer ring of the embodiment of FIG. 1.

Referring now in detail to the drawings, wherein like reference numerals indicate like elements throughout the several views, there is shown in FIGS. 1 and 2, a torque screw 10 in accordance with one preferred embodiment of the present invention. The illustrative device 10 is shown generally comprising a knob 20, a screw 30, a ratchet wheel 40, a C-spring 50, and a retainer ring 60.

Screw 30 is rotationally disposed within knob 20 as depicted in FIGS. 1 and 2. Knob 20 is substantially hollow with an end cap 22 that has a substantially planar inner surface 24. Screw 30 likewise has a substantially planar surface 32 on its head 34. Additionally, the head 34 of screw 30 has an annular flange 36 with a notch 38, the purpose of which will be described in more detail below.

Figure 3:
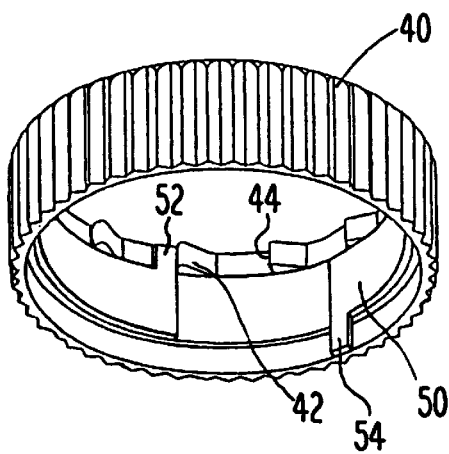
FIG. 3 is a perspective view depicting the interrelationship of the C-spring and ratchet wheel of FIG. 1.

As can be seen in FIGS. 2 and 3, C-spring 50 has an downwardly extending pawl 54 which engages notch 38 on the annular flange 36 of screw 30. As screw 30 rotates in either clockwise or counterclockwise directions, C-spring 50 also must rotate with screw 30. As can be seen in FIG. 1 and in more detail in FIG. 3 which details only the relationship between the ratchet wheel 40 and C-spring 50, C-spring 50 fits snugly within ratchet wheel 40, but is free to rotate within ratchet wheel 40 but is limited by the ratchet action. Upwardly extending pawl 52 engages ratchet wheel teeth 42 as will be described below.

Upon assembly of the torque screw 10 of the present invention, ratchet wheel 40 is pressed into place within the knob 20 as shown in FIG. 1, thereby preventing relative motion of the ratchet wheel 40 with respect to the knob 20. Ratchet wheel 40 preferably has axial knurled teeth 41 on its outer surface, and is preferably constructed of a harder material than that of the knob to allow for the ratchet wheel 40 to be pressed rigidly into position in knob 20. However, ratchet teeth could also be formed integral to the knob 20 (not shown). As described above, C-spring 50 then fits snugly within the ratchet wheel 40, free to rotate, with upwardly extending pawl 52 engaging the teeth of ratchet wheel 40. Screw 30 is then inserted into the knob 20 with the downwardly extending pawl 54 of C-spring 50 engaging screw notch 38.

Finally, retainer ring 60 is placed against the bottom of the annular flange 36 on screw head 30 and the lower portion 26 of the knob 30 is rolled over to secure the screw 30 and C-spring 50 within the ratchet wheel 40 and knob 20. Clearance is provided to allow screw 30 to turn relative to knob 20. Note that FIG. 2 depicts the knob 20 in a condition prior to rolling over. Therefore, when knob 20 is rotated relative to screw 30, upwardly extending pawl 52 interacts with teeth 42 on ratchet wheel 40. The screw 30 is secured from movement in the longitudinal direction within the knob 20, but is free to rotate axially in the clockwise direction once the limit of torque of the screw is reached.

As can be seen in FIG. 3, when ratchet wheel 40 is rotated in a counterclockwise direction, C-spring 50 must also rotate counterclockwise due to the shape of ratchet teeth 42. That is, the teeth 42 have a leading edge that is generally perpendicular to the C-spring 40 such that the teeth 42 positively engage upwardly extending pawl 52. However, when ratchet wheel 40 is rotated in a clockwise direction, C-spring also will rotate to a certain value of torque. As the torque on the threaded shaft 31 of screw 30 increases, the upwardly extending pawl 52 of C-spring 50 will begin to deflect radially inwardly. Note that clearance 39 is provided between the screw head 34 and the ratchet wheel 40 by means of the extended annular surface 36 of the screw 30 to allow for such deflection to take place. See FIG. 1. The occurring friction of the upwardly extending pawl 52 with respect to the teeth 42 on ratchet wheel 40 and the displacement of the C-spring 50 by the teeth 42 provide the desired resistance to rotation thereby supplying a limit to torque that is capable of being supplied to the screw 30 by rotating the knob 20. This torque can be varied by varying the strength of the C-spring 50, for example by increasing its thickness, or changing tooth shape or tooth angle to provide increased axial spring force.

In constructing the torque screw 10 of the present invention, the ratchet wheel 40 is inserted into and pressed into knob 20 to rigidly hold the ratchet wheel 40 to the inside of the knob 20. C-spring 50 is then placed such that the upwardly extending pawl 52 mates with teeth 42 on ratchet wheel 40. Screw 30 is then placed into knob such that downwardly extending pawl 54 mates with notch 38 of screw 30. Finally, retainer ring 60 is inserted and lower portion of knob 26 is rolled over to hold the assembly together and to allow the screw 30 to smoothly rotate within the knob 20.

Thus, torque, applied-by fingers or a screwdriver of an operator, is transmitted from knob 20 to the ratchet wheel 40 to the C-spring 50 to the screw 30. However, when knob 20 is rotated in the clockwise direction, once a specific torque value is reached, upwardly extending pawl 52 on C-spring 50 deflects generally radially inwardly, caused by the angled side of ratchet teeth 44, disengaging the driving action.

A screwdriver recess may also be located on the top of the knob (not shown), if desired, but this would not affect the performance of the screw with respect to torque as described above.

The desired action can also be accomplished by using the opposite configuration of that as described above. In this embodiment, the C-spring is coupled directly to the knob rather than the screw. The screw has an integral toothed ratchet flange (i.e. a ratchet wheel) and thus the same action as the first embodiment is achieved.

Figure 4:
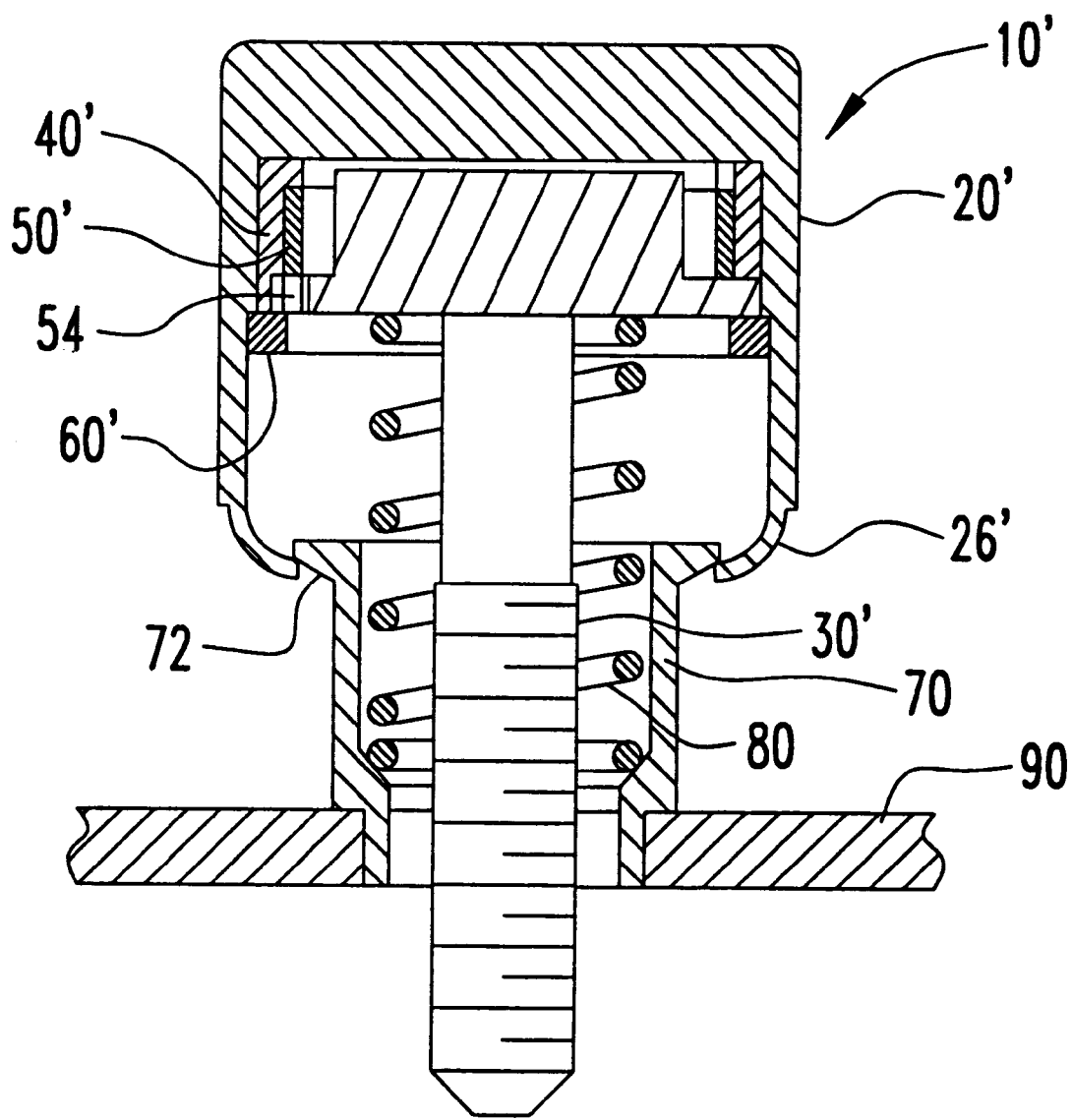
FIG. 4 is cutaway elevational view of a torque screw in accordance with a second embodiment of the present invention, including a means to captivate the torque screw on a panel.

A second embodiment of the torque screw 10' is depicted in FIG. 4 which shows a ferrule which allows the torque screw to be captivated on a panel. This second embodiment 10' is shown generally comprising a knob 20', a screw 30', a ratchet wheel 40', a C-spring 50', and a retainer ring 60', each of which functions in a similar manner to the knob 20, screw 30, ratchet wheel 40, C-spring 50 and retainer ring 60 respectively of the torque screw 10 of FIGS. 1–3. In this embodiment, the retainer ring 60' is of a slimmer configuration, but holds the screw 30' and ratchet assembly in place within the knob, preferably by a knurled surface on the outer perimeter of the retainer ring 60' pressed into place within the knob 30'. This embodiment adds two new major features, a ferrule 70 and an optional spring 80. The ferrule is held in place on a panel 90 by a panel captivation means as known in the art. Such captivation means may include a press-in style, swage-in style, snap-in style, as are well known in the field of captive screws. See, for example, U.S. Pat. No. 5,382,124 to Frattarola. The opposite end of the ferrule has an annular ring 72 which, along with the lower portion of the knob 26' which is rolled over during the assembly to form an inwardly pointing annular surface, forms a captivation means that captivates the knob 30' on the ferrule 70, but allows for limited axial movement and full rotational movement of the knob 30' with respect to the ferrule 70, as limited by the ratchet means. This knob/ferrule attachment configuration is well known in the art. Optionally, a spring 80 is captivated between an inner surface in the ferrule and the bottom of the screw 30' or the knob 20' to bias the screw and ferrule apart, such that the screw 30' is in a retracted position when no downward axial load is applied to the screw 30'.

A major feature which is of particular importance for torque screws in general, as designed into both of the above embodiments is that the ratchet means creates an audible indication of when the maximum torque has been reached. This feature allows the user of the torque screw to hear precisely when the maximum torque has been reached, thereby preventing overtightening of the torque screw and saving time by not spending excess time tightening screws, particularly when multiple screws are used.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A torque screw comprising:
   (a) a screw comprising a head and a threaded shaft;
   (b) a knob having a central longitudinal axis coaxial with said screw; and
   (c) a one-directional ratchet means disposed between said knob and said screw that engages to allow said screw to be unscrewed in a counter-clockwise direction using said knob, and engages when rotated in a clockwise direction to a predetermined torque value, at which point the knob slips relative to the screw.

2. The torque screw of claim 1, including a means to captivate the screw on a panel.

3. The torque screw of claim 2, wherein the means to captivate the screw on the panel is a ferrule with a first and a second end wherein the panel captivation means is at the first end of the ferrule and a knob captivation means is at the second end of the ferrule.

4. The torque screw of claim 1, including an audible signal indicating that the torque screw has reached its predetermined torque limit.

5. A torque screw comprising:
   (a) a screw comprising a head and a threaded shaft;
   (b) a knob having a central longitudinal axis coaxial with said screw,
   (c) a one-directional ratchet means disposed between said knob and said screw that engages to allow said screw to be unscrewed in a counter-clockwise direction using said knob, and engages when rotated in a clockwise direction to a predetermined torque value at which point the knob slips relative to the screw; and
   (d) a retainer ring to secure the screw and ratchet means within the knob.

6. The torque screw of claim 5, including a means to captivate the screw on a panel.

7. The torque screw of claim 6, wherein the means to captivate the screw on the panel is a ferrule with a first and a second end wherein the panel captivation means is at the first end of the ferrule and a knob captivation means is at the second end of the ferrule.

8. The torque screw of claim 5, including an audible signal indicating that the torque screw has reached its predetermined torque limit.

* * * * *